United States Patent [19]

Pierce

[11] Patent Number: 5,255,640
[45] Date of Patent: Oct. 26, 1993

[54] BI-PLASTIC SELF-LOCKING VALVE SPRING RETAINER

[75] Inventor: Daniel H. Pierce, Birmingham, Mich.

[73] Assignee: D.P.I., Birmingham, Mich.

[21] Appl. No.: 28,234

[22] Filed: Mar. 9, 1993

[51] Int. Cl.$^5$ ............................................. F01L 3/10
[52] U.S. Cl. ....................... 123/90.67; 123/188.13; 123/188.17; 251/337; 267/174; 267/179
[58] Field of Search ............. 123/90.65, 90.66, 90.67, 123/188.13, 188.17; 251/337; 267/174, 179

[56] References Cited

U.S. PATENT DOCUMENTS

| | | | |
|---|---|---|---|
| 4,432,311 | 2/1984 | Holtzberg et al. | 123/90.67 |
| 4,653,726 | 3/1987 | Lang et al. | 251/337 |
| 4,665,869 | 5/1987 | Hinz et al. | 123/90.67 |
| 4,879,978 | 11/1989 | Pierce | 123/90.67 |
| 4,989,556 | 2/1991 | Shiina et al. | 123/90.67 |
| 5,143,351 | 9/1992 | Pierce | 251/337 |

FOREIGN PATENT DOCUMENTS

| | | | |
|---|---|---|---|
| 264276 | 4/1988 | European Pat. Off. | 267/179 |
| 176824 | 7/1989 | Japan | 267/179 |
| 171206 | 6/1992 | Japan | 123/90.67 |
| 2218492 | 11/1989 | United Kingdom | 267/179 |

Primary Examiner—Willis R. Wolfe
Assistant Examiner—Weilun Lo
Attorney, Agent, or Firm—Reising, Ethington, Barnard, Perry & Milton

[57] ABSTRACT

A self-locking valve spring retainer (30) operatively retaining a return spring (28) on the stem (20) of a poppet valve (16) comprises an annular base ring (48) from which three flexible arms (52) upwardly extend. A locking step (66) projects radially inwardly from each of the arms (52) to provide an engaging ledge (70) which interlocks with a corresponding mating projection (68) of the valve stem (20). An annular waisted hinge (86) is formed between the three arms (52) and the base ring (48) to ease stresses on the retainer (30) as the arms (52) are blossomed outwardly during installation and removal. The annular base ring (48) is fabricated from a first organic polymeric material capable of deformation thus permitting the arms (52) to flex outward therefrom. The locking step (66) of each arm (52) is fabricated from a second organic polymeric material, harder than the first material, thereby forming a durable interface between the valve stem (20) and the arms (52) to better distribute shear forces throughout the arms (52).

10 Claims, 2 Drawing Sheets

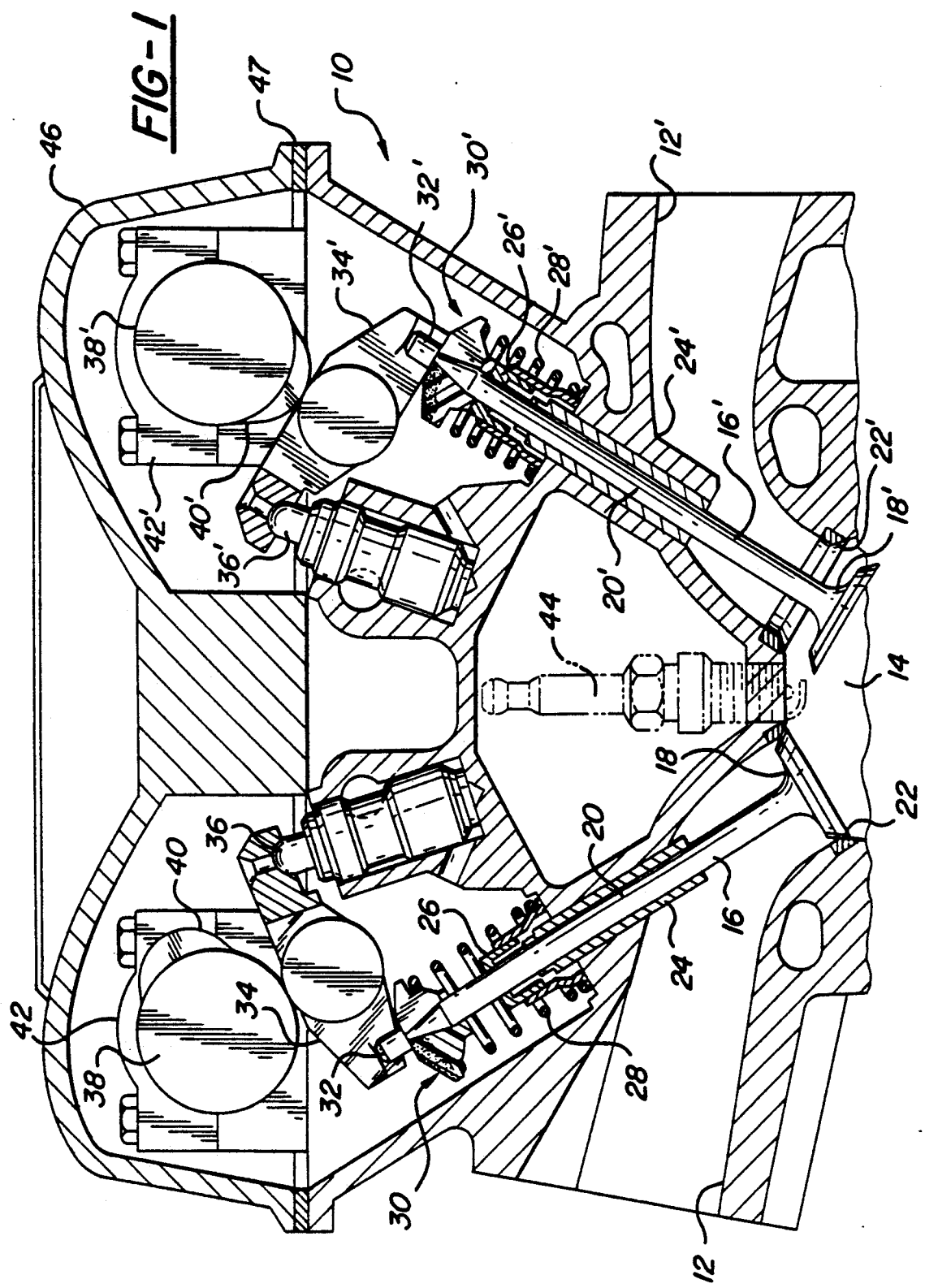

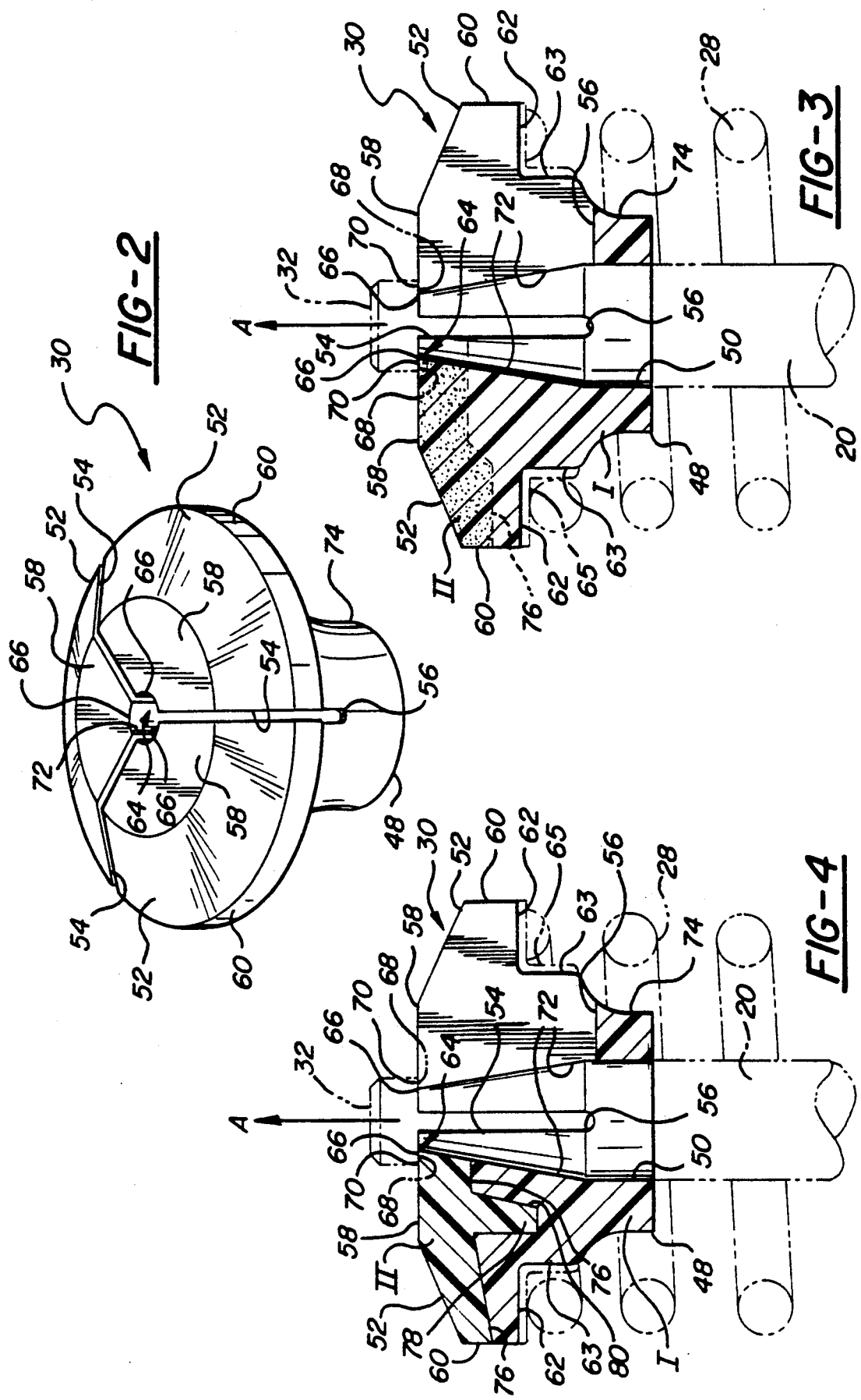

5,255,640

BI-PLASTIC SELF-LOCKING VALVE SPRING RETAINER

TECHNICAL FIELD

The subject invention relates to a self-locking valve spring retainer for operatively retaining a return spring on the stem of a poppet valve.

BACKGROUND ART

Valve spring retainers are used in internal combustion engines to operatively retain a return spring on the stem of a poppet valve. Self-locking valve spring retainers are known in the art wherein the retainer automatically locks on the stem of the poppet valve as the retainer is pressed onto the valve stem. Self-locking valve spring retainers are advantageous in that they are easily installed in one quick motion by pressing onto the valve stem.

Examples of self-locking valve spring retainers are disclosed in U.S. Pat. Nos. 4,879,978 and 5,143,351, both to Pierce, the inventor of the subject invention. The subject matter of the aforementioned patents is included within the description of the subject invention by way of reference. Both of the Pierce references disclose self-locking valve spring retainers for operatively retaining a return spring on the stem of a poppet valve. Both of the references disclose an annular base ring and a plurality of arms extending in cantilever fashion from the base ring for flexing as the retainer is pressed over the end of the valve stem to an operative position. A self-locking means extends from each of the flexible arms for automatically engaging and gripping the valve stem when in the operative position.

Valve spring retainers are subjected to high shear stresses due to forces exerted thereon by very stiff return springs. Such shear stresses are focused about a small area of direct contact between the end of the valve stem and retainer. As a consequence of these shear stresses and the high temperature operating environment of an internal combustion engine, retainers may weaken and fail prematurely. U.S. Pat. No. 5,143,351 to Pierce addresses this problem by providing an independent metallic anti-wear plate disposed between the retainer and the end of the valve stem for distributing shear forces throughout the retainer instead of localized areas thereof. Although effective, the metallic anti-wear plate is somewhat difficult to install and further adds to the cost of the retainer.

SUMMARY OF THE INVENTION AND ADVANTAGES

The subject invention comprises a self-locking valve spring retainer for operatively retaining a return spring on the stem of a poppet valve. The subject retainer comprises an annular base ring having a substantially cylindrical inner periphery which defines a stem passage for surrounding a valve stem. The retainer further includes a plurality of arms extending in cantilever fashion from the base ring and surrounding the stem passage for resiliently flexing outwardly from the base ring as the retainer is pressed over the end of the valve stem to an operative position. The retainer also includes a locking step projecting radially inwardly from each of the arms for automatically engaging and interlocking with a mating projection of the valve stem when in the operative position. The annular base ring is fabricated from a first organic polymeric material readily capable of deformation thereby permitting the arms to flex outwardly from the base ring without fracturing the base ring. The subject retainer is characterized by the locking steps being fabricated from a second organic polymeric material, harder than the first material, for forming a durable interface between the mating projection of the valve stem and each of the arms to better distribute shear forces throughout the arms and thereby extend the life of the retainer.

The self-locking valve spring retainer of the subject invention provides a superior one-piece retainer which includes tough locking steps which extend the operative life of the retainer by forming a durable surface between the valve stem and the retainer which more efficiently distributes shear forces throughout the retainer.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a cross-sectional view of a typical cylinder head for an internal combustion engine including dual overhead cams and a valve train incorporating the self-locking valve spring retainer according to the subject invention;

FIG. 2 is a perspective view of a self-locking valve spring retainer according to the subject invention;

FIG. 3 is a cross-sectional view of a self-locking valve spring retainer according to the subject invention;

FIG. 4 is a cross-sectional view of a self-locking valve spring according to an alternative embodiment of the subject invention.

DETAILED DESCRIPTION OF THE PREFERRED EMBODIMENT

Referring to the figures, wherein like numerals indicate like or corresponding parts throughout the several views, a cross-sectional view of a typical cylinder head is generally shown at 10 in FIG. 1. The cylinder head 10 is positioned over the combustion chamber (not shown) of an internal combustion engine for directing fuel and exhaust into and out of the combustion chamber. Accordingly, the cylinder head 10 includes an intake port 12 extending from an intake manifold (not shown) to the roof 14 of the combustion chamber. An intake valve, generally indicated at 16, includes a valve head 18 and a valve stem 20. The valve head 18 sealably engages and covers an intake valve seat 22 formed at the exit end of the intake port 12. The valve stem 20 is slideably supported in a valve guide 24, which in turn is fixedly pressed into the cylinder head 10. A guide end seal 26 covers the upper end of the valve guide 24 and engages the valve stem 20 in a boot-like manner for wiping oil from the valve stem 20 to prevent oil from collecting over the valve guide 24. A return spring 28 is disposed concentrically about the valve stem 20 and extends from a bottom flange on the guide end seal 26 to a self-locking valve spring retainer, generally indicated at 30. With the retainer 30 secured to the valve stem 20, the biasing force of the return spring 28, continuously urges the valve 16 upwardly into sealing engagement with the intake valve seat 22.

The valve stem 20 includes a top end 32 extending above the retainer 30 and presented for engagement by the free end of an oscillating rocker arm 34. The opposite end of the rocker arm 34 is supported in a fulcrum-like manner by a hydraulic valve lash adjustor 36. The valve lash adjustor 36 is rigidly supported in a dedicated recess of the cylinder head 10. A rotary cam shaft 38 having a lobe 40 extending therefrom is rotatably supported in a bearing 42 adjacent the rocker arm 34 so that upon engagement with the lobe 40, the rocker arm 34 is rotated about its fulcrum at the valve lash adjustor 36 to downwardly displace the valve 16 against the biasing force of the return spring 28. As the lobe 40 rotates away from the rocker arm 34, the return spring 28 urges the intake valve 16 back to the position shown in FIG. 1 with the head 18 perfecting a fluid-tight seal with the valve seat 22.

In a similar manner, an exhaust port 12' is provided and includes a valve seat 22' disposed at the entrance end thereof for engaging and perfecting a seal against the head 18' of an exhaust valve 16'. The exhaust valve 16' includes a stem 20' reciprocally supported in a valve guide 24'. A guide end seal 26' covers the upper end of the valve guide 24' and wipes oil from the valve stem 25. A compression type return spring 28' is concentrically disposed about the valve stem 20' and is operatively engaged therewith by way of a retainer 30'. A rocker arm 34' operatively engages a top end 32' of the valve stem 20' and is pivotally supported by a valve lash adjustor 36'. An exhaust cam shaft 38' includes a lobe 40' which engages and displaces the rocker arm 34' to actuate the valve 16', as shown in FIG. 1. In typical fashion, the return spring 28' returns the valve 16' to a closed position as the lobe 40' rotates away from the rocker arm 34'.

A spark plug 44 includes an electrode end extending through the roof 14 of the compression chamber for igniting the compressed air/fuel mixture therein. A valve cover 46 provides a protective enclosure for the cylinder head 10, with a gasket 47 providing a sealed interface at the common juncture therebetween.

With reference to FIGS. 2, 3 and 4, the subject self-locking valve spring retainer is generally shown at 30 and is of the type for operatively retaining a return spring 28 on the stem 20 of a poppet valve 16. The subject retainer 30 comprises an annular base ring 48 for contiguously surrounding the valve stem 20. The base ring 48 has a substantially cylindrical inner periphery defining a bottom portion of a stem passage 50 having a vertical central axis A. Preferably, the inner periphery of the base ring 48 is dimensioned to tightly, i.e., frictionally, engage about the valve stem 20 to provide a preliminary oil seal thereby preventing at least a portion of the circulated lubricating oil from dripping down the stem 20 onto the valve guide 24. The central axis A coincides with the natural axis of the valve 16 when the retainer 30 is operatively connected to the upper end of the valve stem 20.

A plurality of arms 52 extend in cantilever fashion from the base ring 48 for flexing outwardly from the base ring 48 as the retainer 30 is pressed over the top end 32 of the valve stem 20 to its operative position. The subject retainer 30 is shown in the operative position on the valve stem 20 in FIGS. 3 and 4. The arms 52 extend axially from the base ring 48 and flex radially outwardly from the central axis A upon insertion over the top end 32 of the valve stem 20. In the preferred embodiment illustrated in the figures, there are three arms 52 disposed equally about the base ring 48. Therefore, the arms each sweep an arc of approximately 120°. An expansion slot 54 separates each adjacent pair of arms 52 and has a bottom 56 terminating at the base ring 48. The three expansion slots 54 radiate straight from the stem passage 50 outwardly to the exterior periphery of the arms 52.

Referring now to FIGS. 3 and 4, each of the arms 52 are shown to include an upper surface 58 disposed in a plane generally perpendicular to the central axis A. Each arm 52 extends radially outwardly along the upper surface 58 to an arcuate flange 60. Each of the three flanges 60 are aligned in a common horizontal plane and describe a single generally angular flange soffit 62 interrupted only by the three expansion slots 54. A substantially axially extending arcuate pilot surface 63 depends from each of the flange soffits 62. The flanges 60 are provided for engaging the return spring 28. As shown in FIGS. 3 and 4, the return spring 28 engages the flange soffits 62 and snugly encircles the pilot surfaces 63 when the retainer 30 is disposed in the operative position. Because of the snug, encircling fit of the return spring 28 about the pilot surfaces 63, the retainer 30 remains effectively locked on the end of the valve stem 20 while in the operative position. In some cases, an L-shaped washer 65 may be disposed over the top of the return spring 28 to provide a better contact surface between the return spring 28 and flange 60, as shown in phantom in FIGS. 3 and 4.

A self-locking means, generally indicated at 64 in FIGS. 3 and 4, extends inwardly from each of the arms 52 for automatically engaging and gripping the valve stem 20 when the retainer 30 is disposed in the operative position. That is, as the retainer 30 is pressed over the top end 32 of the valve stem 20, the self-locking means 64 is positioned on the radially inward surface of each of the arms 52 and poised to automatically engage and grip the valve stem 20 once the retainer 30 has reached the operative position on the valve 16.

More specifically, the self-locking means 64 comprises a locking step 66 projecting radially inwardly from each of the arms 52 for automatically engaging and interlocking with a mating projection 68 on the valve stem 20 to decrease the concentration of shear stresses within the retainer 30. The subject invention may comprise additional locking steps, as shown in U.S. Pat. No. 5,143,351 to Pierce to further decrease the shear stresses created in each locking step during operation.

The locking step 66 is formed coextensively along the upper surface 58 of each of the arms 52 and includes an arcuate ledge 70 disposed in a plane generally perpendicular to the central axis A. The ledge 70 of the locking step 66 is formed coincidentally with the upper surface 58 of the arms 52 so that the mating projection 68 of the valve stem 20 abuts the upper surface 58 of each arm 52. A frustoconical relief 72 extends axially from the locking step 66 to the inner periphery of the base ring 48.

Hence, the stem passage 50 comprises the portions of the inner periphery of the base ring 48 and the relief 72. The stem 20 of the valve 16 is shaped in a corresponding manner to the stem passage 50 so that upon reaching the operative position, the locking step 66 snaps into position to fully contiguously grip the valve stem 20. Moreover, the stem may include minute ridges disposed therealong (not shown) for gripping to the stem passage 50 thereby adding to the load carrying capacity of the retainer 30.

As the retainer 30 is pressed over the top end 32 of the valve stem 20 and before reaching the operative position, the arms 52 are forced to flex outwardly from the base ring 48 due to the relatively large diameter of the top end 32 of the valve stem 20 passing through the relief 72. This outward flexure of the arms 52 is referred to as blossoming because the retainer 30 appears to expand outwardly in much the same manner as a blossoming flower. Because the three arms 52 are joined together only by the annular base ring 48, all of the bending moments created during blossoming are resisted within the base ring 48.

In order to reduce the stresses on the base ring 48 during blossoming, the subject retainer 30 provides a waisted hinge 74 disposed in the base ring 48 for establishing a definite hinge location between each of the arms 52 and the base ring 48 to thereby reduce stress in the base ring 48 as the arms 52 are flexed outwardly, i.e., blossomed, over the valve stem 20 during installation and removal of the retainer 30. More particularly, the waisted hinge 74 is disposed about the exterior periphery of the base ring 48 so as not to interfere or interrupt the stem passage 50. The waisted hinge 74 is disposed annularly and concentrically about the base ring 48 in a horizontal plane generally perpendicular to the central axis A to describe a single generally annular groove just below the bottoms 56 of the expansion slots 54. Hence, the expansion slots 54 extend downwardly to just about the waisted hinge 74 and do not interrupt the waisted hinge 74 from forming one continuous annular groove. The waisted hinge 74 is best illustrated in FIGS. 3 and 4 as a scalloped, or radiused, impression in the exterior surface of the base ring 48. That is, the waisted hinge 74 has a middle portion which is narrower than either of the ends of the base ring 48. Hence, the narrow middle portion has a smaller external diameter than any other portion of the base ring 48. The waisted hinge 74 permits the subject retainer 30 to be removed and reinstalled onto the valve 16 several times and in cold weather without creating stress fractures in either the base ring 48 or the arms 52.

The subject retainer 30 is fabricated from two dissimilar injection moldable materials. More specifically, the annular base ring 48, waisted hinge 74, and portions of the arms 52 and stem passage 50 are preferably injection molded from a first polymeric material which is capable of flexing and deforming thus permitting the arms 52 to flex outwardly to accommodate the large diameter of the top end 32 of the valve stem 20 as the retainer 30 is being installed or removed from the operative position, without fracturing the base ring 48. Furthermore, the majority of the stem passage 50 is preferably injection molded from the first polymeric material which is somewhat elastic and provides a gripping frictional interfacial fit with the valve stem 20.

The locking steps 66 of each arm 52 are preferably injection molded from a second polymeric material, which is harder than the first material, for forming a durable interface between the mating projection 68 of the valve stem 20 and each arm 52 to better distribute shear forces throughout the arms 52 and thereby extend the life of the retainer 30. In addition, the upper surface 58 of each arm 52 may also be injection molded from the second harder material to further distribute shear forces throughout the arms 52. Furthermore, substantial portions of the arms 52 may be injection molded with the second harder material.

The portions of the retainer 30 fabricated from the first material are shown in FIGS. 3 and 4 as cross-sectional lines corresponding with the reference numeral I, whereas portions fabricated from the second harder material are denoted with the reference numeral II. A separating line 76 is included in FIGS. 3 and 4 indicating a division between the first I and second II materials. Although the separating line 76 indicates complete separation between the first I and second II materials, in reality, by injecting the second material II over the top of the first material I, and by using materials of a similar base resin, a strong bonding occurs between the two materials. The materials may also be molded in reverse order, with material I being molded over material II.

As indicated by the separation line 76 in FIGS. 3 and 4, the portions of the retainer fabricated from the second harder material II may vary. That is, while only the locking steps 66 may be fabricated from the second material II, the entire upper surface 58 of the arms 52 along with portions of the flanges 60 may also be fabricated from the second material II, as shown in FIGS. 3 and 4.

With particular reference to FIG. 4, the portions of the retainer fabricated from the second harder material II also include a locking arm 78 extending downwardly from the upper surface 58 along an axis generally parallel to axis A. The portion of the retainer fabricated from the first, softer material I includes a corresponding channel 80 for receiving the locking arm 78. Due to the locking fit of the locking arm 78 within the channel 80, the portion of the retainer fabricated from the second material II, is mechanically locked or attached to the portion of the retainer fabricated from the first material I. Moreover, the locking arm 78 and channel 80 interface 76 provides greater surface area between the first and second materials thereby providing a stronger bond therebetween. Thus, not only are the materials (I and II) bonded together during the molding process, they are further mechanically locked to one another to further assure permanent attachment therebetween. The locking arm 78 is shown having a cross-sectional thickness approximately equal to the thickness of the upper surface 58 of the retainer. Those skilled in the molding art will readily appreciate that such relatively uniform wall thicknesses promote uniform cooling of the material after molding.

The first and second materials comprise an injection moldable organic polymeric material, preferably 4/6 nylon STANYL TM, but other nylons, polyamides, and organic polymeric materials may be used. The first and second materials need not be comprised of the same organic polymeric materials, but by using materials of the same base resin, a strong bonding of the two materials is more readily attained.

The first material may also include a rubber or elastomeric constituent interspersed therein for increasing the allowable strain of the base ring 48.

In order to harden the second material, composite filler material may be added thereto including glass, carbon, KEVLAR TM, or other reinforcing fibers and fillers, thus producing a stronger more durable material than the first material which holds up and remains strong after prolonged exposure to heat and shear forces.

The second material is preferably reinforced with 50% glass fibers. Alternatively, the second material may comprise an organic polymer material. which is sufficiently hard without reinforcement with composite fibers or fill material.

The retainer is preferably injection molded by way of a two-shot molding process, as is commonly known in the art. The two-shot molding process is a method of molding two materials in a single injection molding machine (not shown). Such machines are common in the art and can be obtained from such manufacturers as Battenfeld GmbH, Postfach 11 64/65, D-58 82, Melnerzhagen or Husky Injection Molding Systems Inc., 2479 Walden Avenue, Buffalo, N.Y. The two-shot molding machine typically includes at least two individual injection units, where each material is separately processed. Typically, such machines include a platen which rotates 180° so that a mold cavity or core can be rotated into position relative to the proper injection unit. When utilizing such a two-shot molding machine, parts are molded by first injecting one material, opening the mold, rotating or transferring a new cavity or core into place, closing the mold and injecting the second material directly over the first material. Both materials are simultaneously injected during one machine cycle. While the material for the first shot is being injected into the primary core/cavity, the second material is being molded over the first shot. In this way, parts are being completed during every machine cycle. If compatible resin systems are utilized, the second material will melt the surface layer of the first material forming a strong bond between the two materials.

The subject retainer may be installed and removed upon a valve stem by a handling tool as disclosed in U.S. Pat. No. 5,143,351. Such a tool greatly assists in the installation and removal of the retainer and is fully described in the aforementioned patent.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A self-locking valve spring retainer (30) operatively retaining a return spring (28) on a stem (20) of a poppet valve (16) in an internal combustion engine, said retainer comprising:

an annular base ring (48) having a substantially cylindrical inner periphery defining a stem passage (50) surrounding a valve stem (20);

a plurality of arms (52) extending in cantilever fashion from said base ring (48) and surrounding said stem passage (50) for resiliently flexing outwardly from said base ring (48) as said retainer (30) is pressed over the end of the valve stem (20) to an operative position said arms having flanges engaging the return spring;

a locking step (66) projecting radially inwardly from each of said arms (52) for automatically engaging and interlocking with a mating projection (68) of the valve stem (20) when in the operative position;

said annular base ring (48) fabricated from a first organic polymeric material capable of flexing without fracturing thereby permitting said arms (52) to flex outwardly from said base ring (48); and characterized by said locking steps (66) fabricated from a second organic polymeric material which is harder than said first material for forming a durable interface between the mating projection (68) of the valve stem (20) and each of said arms (52) to better distribute shear forces throughout said arms (52) and thereby extend the life of the retainer (30).

2. A retainer as set forth in claim 1 wherein a central axis (A) extends centrally through said stem passage (50) and said arms (52) each include an upper surface (58), further characterized by said locking steps (66) each including an arcuate ledge (70) disposed in a plane generally perpendicular to said central axis (A) and formed coextensively along said upper surface (58) of said respective arms (52).

3. A retainer as set forth in claim 2 further characterized by each upper surface (58) of each arm (52) fabricated from said second, harder material to further distribute shear forces throughout said arms (52).

4. A retainer as set forth in claim 3 wherein said retainer includes a locking arm (78) extending from said upper surface (58) toward said base ring (48) and fabricated from said second, harder material and is further characterized by including a corresponding channel (80) fabricated from said first, softer material for receiving said locking arm (78).

5. A retainer as set forth in claim 3 further characterized by the majority of said stem passage (50) fabricated from said first material thereby providing a gripping interfacial fit between said stem passage (50) and the valve stem (20).

6. A retainer as set forth in claim 5 further characterized by said first and second materials capable of being injection molded.

7. A retainer as set forth in claim 6 further characterized by said second material including reinforcing filler material disposed within said organic polymeric material for strengthening and hardening said second material.

8. A retainer as set forth in claim 7 further characterized by said organic polymeric material comprising a polyamide.

9. A retainer as set forth in claim 7 further characterized by said reinforcing filler material comprising glass fibers.

10. A retainer as set forth in claim 7 further characterized by said locking steps (66) bonded with said arms (52).

* * * * *